United States Patent

[11] 3,629,732

[72] Inventors Philip E. King
Acton;
Paul C. Finne, Reading, both of Mass.
[21] Appl. No. 821,650
[22] Filed May 5, 1969
[45] Patented Dec. 21, 1971
[73] Assignee Alpha Industries, Inc.
Newton Upper Falls, Mass.

[54] BROADBAND BIASING CIRCUIT COOPERATING WITH SWITCH TO ESTABLISH BROADBAND RF FILTER PATH BETWEEN INPUT AND OUTPUT PORTS
3 Claims, 3 Drawing Figs.

[52] U.S. Cl. .......... 333/7, 333/73 C, 333/97 R
[51] Int. Cl. .......... H01p 1/10
[50] Field of Search .......... 333/7, 73 C, 81 A, 97 S, 98 S, 73, 81, 97, 98

[56] References Cited
UNITED STATES PATENTS
3,453,564 7/1969 Russell .......... 333/81
3,475,700 10/1969 Ertel .......... 333/7
OTHER REFERENCES
R. V. Garver, Theory of TEM Diode Switching, IRE Trans. on MTT, May 1961, pp. 232–234 relied on

*Primary Examiner*—Herman Karl Saalbach
*Assistant Examiner*—Paul L. Gensler
*Attorney*—Charles Hieken

ABSTRACT: A broadband biasing circuit in a coaxial line configuration includes L-networks formed of series capacitors and shunt inductors. The inductors are coils formed within the coaxial line and have a diameter approximately half the diameter of the inner conductor. The L-networks connect to the RF-signal terminals of a device to be biased and supply bias signals to the device through the inductors. The L-networks selectively interconnect with one another through the device forming a substantially reflectionless high-pass filter circuit.

INVENTOR.
PHILIP E. KING
PAUL C. FINNE
BY
Wolf Greenfield Hieken & Sacks
ATTORNEYS

BROADBAND BIASING CIRCUIT COOPERATING WITH SWITCH TO ESTABLISH BROADBAND RF FILTER PATH BETWEEN INPUT AND OUTPUT PORTS

BACKGROUND OF THE INVENTION

The present invention relates in general to broadband biasing circuits and more particularly concerns a novel broadband biasing circuit of high electrical performance and small physical form which is relatively easy and inexpensive to fabricate in large and small quantities with uniformly high quality.

In one well-known biasing circuit, the bias signal is introduced by means of a relatively large conductor extending through the outer conductor straight to the inner conductor. While these biasing circuits perform satisfactorily, the relatively large size of the conductor reacts with the outer and inner conductors so as to alter the electrical properties and frequently requires the introduction of special compensating elements within the cavity. Also, this method of introduction of a bias signal unduly limits the frequency response of the circuitry. Furthermore, a number of alternatives to the above method require precise machining and assembly procedures which tend to increase the coast and size of the biasing circuit.

Accordingly, it is an important object of this invention to provide a broadband-biasing circuit which is relatively easy and inexpensive to fabricate.

It is another object of the invention to provide a broadband-biasing circuit in accordance with the preceding object that maintains a substantially low SWR throughout a broad band of frequencies.

It is another object of this invention to provide a broadband-biasing circuit which may be integrally formed with a device to be biased or may be included by discrete packaging techniques.

It is another object of the invention to provide a broadband-biasing circuit susceptible of sealed or unsealed operation which may be used in conjunction with a variety of devices to be biased.

It is another object of the invention to provide a broadband-biasing circuit which does not unduly limit the bandwidth of the biased device.

Another object of the invention is to achieve one or more of the preceding objects while keeping costs relatively low.

SUMMARY OF THE INVENTION

According to the invention, there is a device to be biased, as for example a diode switch, having an input signal terminal and at least one output signal terminal. A plurality of substantially reactive circuits, in a TEM waveguide configuration, embrace the diode switch and connect to its signal terminals. The circuits each include a serially connected first substantially capacitive element and a shunt-connected substantially inductive element for supplying a bias signal to the diode switch. Bias signal provides the input for the first terminal of the substantially inductive element which is essentially included within the boundary of the TEM waveguide and connects by a second terminal to the terminal of the first capacitive element nearest the diode switch. The bias signal renders the output signal terminals of the diode switch selectively responsive to an RF signal input. The substantially reactive circuits then selectively interconnect through the diode switch, coacting therewith and with one another to form a substantially reflectionless filter circuit. The first terminal of at least one of the substantially inductive elements interconnects with ground by a second substantially capacitor element which acts essentially as a short circuit to RF signal and an open circuit to the bias signal.

DETAILED DESCRIPTION OF PREFERRED EMBODIMENTS

Corresponding reference symbols will be used throughout the drawings to indicate corresponding elements where applicable.

Figure 1:
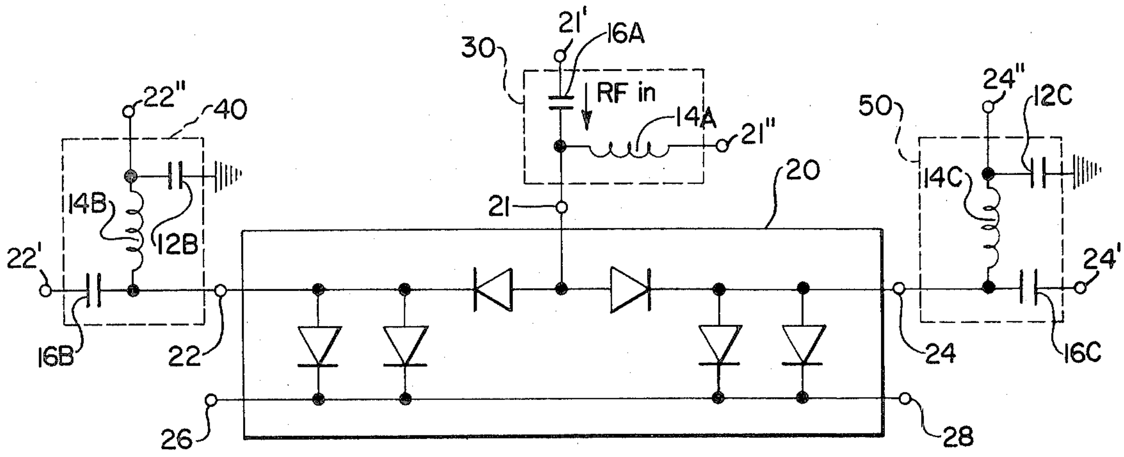
FIG. 1 is a schematic circuit diagram of the broadband-biasing circuit according to the invention.

With reference now to the drawings and more particularly to FIG. 1 thereof, there is shown a schematic circuit diagram of an embodiment of the invention. A device to be biased 20, as for example a diode switch, has an input signal terminal 21 and output signal terminals 22 and 24. A substantially reactive circuit 30 including serially connected capacitive element 16A and shunt-connected inductive element 14A connects to the input signal terminal 21 of the device to be biased 20. Substantially reactive circuits 40 and 50 comprising serially connected capacitors 16B and 16C and shunt-connected inductive elements 14B and 14C respectively connect to the output signal terminals 22 and 24 of the device to be biased 20. In addition, capacitors 12B and 12C connect shunt inductive elements 14B and 14C with ground potential at their terminals remote from the respective signal terminals 22 and 24. Capacitors 16A, 16B and 16C are respectively in series between input signal terminal 21, output signal terminal 22, output signal terminal 24 and additional input signal terminal 21', additional output signal terminal 22' and additional output signal terminal 24', respectively. Since for RF, bias terminals 21'', 22'' and 24'' are effectively grounded, inductive elements 14A, 14B and 14C may be regarded as shunt elements that are in parallel with the impedance between a respective additional signal terminal and ground. Terminals 26 and 28 may be regarded as the reference terminals of device 20 that are ordinarily grounded.

The diode switch 20 is chosen so that signal passes from input signal terminal 21 selectively to the output signal terminals 22 and 24. Thus, the substantially reactive circuit 30 connected to terminal 21 coacts exclusively with the substantially reactive circuits 40 or 50 connected to signal terminals 22 and 24 aNd with the diode switch 20 to form a substantially reflectionless filter circuit.

Figure 2:
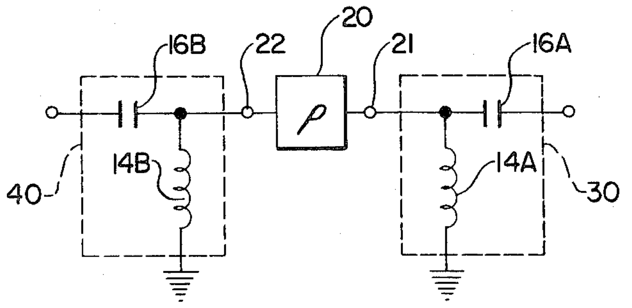
FIG. 2 is a schematic circuit of the broadband-biasing circuit further showing the interaction of the reactive elements.

FIG. 2 is a schematic circuit diagram of the broadband-biasing circuit further illustrating the interaction of the reactive elements when signal terminal 24 is switched to the "off" position. Switch 20 is illustrated as having some complex reflection coefficient, $\rho$, and interconnects the reactive elements in the biasing circuits 30 and 40. Capacitor 12B (as shown in FIG. 1) has been chosen so that inductive element 14B is maintained substantially at RF ground potential in the frequency range of interest and is not shown in FIG. 2.

Figure 3:
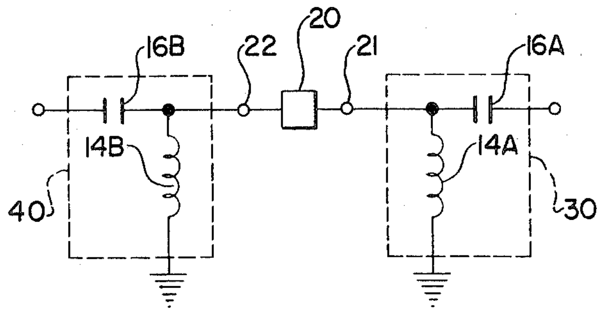
FIG. 3 is a schematic circuit of the broadband-biasing circuit further showing a lossless, reflectionless device to be biased.

FIG. 3 is a schematic circuit diagram of the broadband-biasing circuit further showing a substantially lossless, reflectionless device to be biased 20. Thus, a substantially reactive tee filter circuit is formed having serially connected capacitive elements 16A and 16B and essentially the parallel combination of substantially inductive elements 14A and 14B as the shunt element. The phase shift through device to be biased 20 may be realized by utilization of well-known transmission line techniques. The values of the respective elements may then be calculated using Smith Chart criteria to achieve a substantially reflectionless filter circuit. At relatively low frequencies, the phase shift through the diode switch 20 may be disregarded, thus, inductive elements 14A and 14B will be essentially in parallel combination.

In a specific embodiment of the invention, an Alpha Industries-type MO 2949 single-pole, double-throw switch was used as the device to be biased. The biasing circuitry was enclosed in a coaxial configuration having an outer diameter of inner conductor of 0.050 inch and an inner diameter of outer conductor of 0.115 inch. The substantially inductive elements were constructed in an essentially helical shape from 0.002 inch diameter wire with 0.0005 inch thick insulation. The helix comprising eight turns had a total length of 0.032 inch and was wound on a 0.020 inch diameter rod. The total length of the eight turn helix was substantially included within the cavity formed by the outer conductor and yielded an inductance of 18$\mu$h.

A 600 picofarad capacitor was used in the output biasing circuits to maintain the substantially inductive elements essentially at RF ground potential. The serially connected input and output capacitors were 8 picofarads. The biasing circuit operated over a frequency range of 500 MHz. to 18 GHz. and when connected with the switch had a maximum SWR of 2.0 over that range.

An important feature of the invention is the adaptability of the structure to utilization of different devices to be biased. The device to be biased may be a substantially lossless, reflectionless single component or series of components. The device to be biased may have a nonzero reflection coefficient. The components of the biasing circuit may be calculated so that, upon coacting with one another and with the device to be biased, a substantially reflectionless structure is achieved.

Another important feature of the invention is the adaptability of the structure to different configurations of devices to be biased. If the device to be biased includes serially connected unilaterally conducting elements, then the inductive element in the input portion of the biasing circuit may be connected directly to ground potential. A return path for bias signal will be provided in this manner. If the device to be biased includes only shunt-connected unilaterally conducting elements, then the inductive elements in the biasing circuits may be connected to ground by capacitive elements which effectively block the bias signal while passing substantially all the RF signal to ground.

Another important feature of the invention is the adaptability to different configurations or devices to be biased. The biasing circuitry may be connected without the device to be biased or may be integrally combined with the device to be biased in a single package.

Another important feature of the invention is the adaptability of the bias circuit for returning a bias signal to ground. The shunt-connected substantially inductive element in the input bias circuit may have one terminal maintained substantially at ground potential. Thus, other circuitry either external or internal for returning the bias signal to ground is not needed.

The biasing circuitry may be incorporated within a cylindrical cavity formed by the outer casing. The cavity may be rectangular or any other suitable shape. The biasing circuit may also be constructed of parallel plates forming a transmission line with the substantially inductive shunt elements extending to either plate. Also, the biasing circuit may be constructed in microstrip or any other TEM waveguide configuration.

Other modifications and uses and departures from the specific embodiments described herein may be practiced by those skilled in the art without departing from the inventive concepts. Consequently, the invention is to be construed as embracing each and every novel feature and novel combination of features present in or possessed by the apparatus and techniques herein disclosed and is limited solely by the spirit and scope of the appended claims.

What is claimed is:

1. A broadband-biasing circuit comprising, means defining a device to be biased including an input signal terminal and at least first and second output signal terminals, said device normally biased for establishing a signal path between said input signal terminal and a selected one of said output signal terminals, means defining a plurality of substantially reactive circuits each coupled to a respective one of said signal terminals for exchanging energy between an additional input signal terminal and a selected one of at least first and second additional output signal terminals associated with said first input signal terminal, said first output signal terminal and said second output signal terminal respectively and having a DC bias terminal coupled to an associated signal terminal by an inductive means and having capacitive means coupling an associated signal terminal to an associated additional signal terminal, the means defining said reactive circuits having parameter values coacting with those of the means defining said device and each other to establish a substantially reflectionless filter path between said additional input signal terminal and the selected additional output signal terminal, means defining second substantially capacitive elements coupling the DC bias terminals of said substantially reactive circuits associated with output signal terminals to ground, said substantially reactive circuits and said device to be biased including means defining TEM waveguide configurations and means defining a substantially lossless, reflectionless device with outer conductor means and inner conductor means coacting to define coaxial transmission line means substantially including said substantially reactive circuits, said substantially inductive elements including helical means having an outer diameter substantially half the diameter of said inner conductor and a total length essentially included between said inner and outer conductors.

2. A broadband-biasing circuit according to claim 1 wherein said helical means comprises an inductor having a number of turns corresponding substantially to 160 times the diameter, in inches, of the inner conductor.

3. A broadband-biasing circuit according to claim 2 wherein said substantially reactive circuit coupled to said input signal terminal includes said second substantially capacitive element intercoupling said substantially inductive element with ground potential.

* * * * *